United States Patent [19]

Hsiao et al.

[11] Patent Number: 5,781,651

[45] Date of Patent: Jul. 14, 1998

[54] COMPACT FINGERPRINT RECOGNIZING APPARATUS ILLUMINATED WITH ELECTROLUMINESCENT DEVICE

[75] Inventors: Pei-Yung Hsiao, Taipei, Taiwan; Paul-Waie Shew, Jalan Istimewa, Singapore

[73] Assignee: Aetex Biometric Corporation, Taipei, Taiwan

[21] Appl. No.: 632,608

[22] Filed: Apr. 15, 1996

[51] Int. Cl.⁶ .................................. G06K 9/62
[52] U.S. Cl. ............................................ 382/127
[58] Field of Search .......................... 382/127, 126, 382/125, 124, 116; 356/71; 396/15; 427/1; 209/585; 359/439, 831; 70/277; 257/81; 340/825.34

[56] References Cited

U.S. PATENT DOCUMENTS

| | | | |
|---|---|---|---|
| 5,105,467 | 4/1992 | Kim et al. | 382/4 |
| 5,109,427 | 4/1992 | Yang | 382/4 |
| 5,210,588 | 5/1993 | Lee | 356/71 |
| 5,467,403 | 11/1995 | Fishbine et al. | 382/116 |
| 5,650,640 | 7/1997 | Stafford et al. | 257/81 |
| 5,650,842 | 7/1997 | Maase et al. | 356/71 |

Primary Examiner—David K. Moore
Assistant Examiner—Brian P. Werner

[57] ABSTRACT

A fingerprint recognizing apparatus includes: a prism, an electroluminescent device secured or adhered on an incident surface of the prism for emitting a uniform light towards a finger-laying surface of the prism with the light beam reflected at the valleys of the fingerprint, a photosensor selected from a charge-coupled-device (CCD) sensing camera for picking up the image as reflected from the prism for converting the image signal to be a voltage signal, and an image processing and recognizing circuit for processing the voltage signal for fingerprint identification, wherein the energizing of the ELD is synchronized with the image processing and recognizing for a reliable fingerprint recognization.

1 Claim, 5 Drawing Sheets

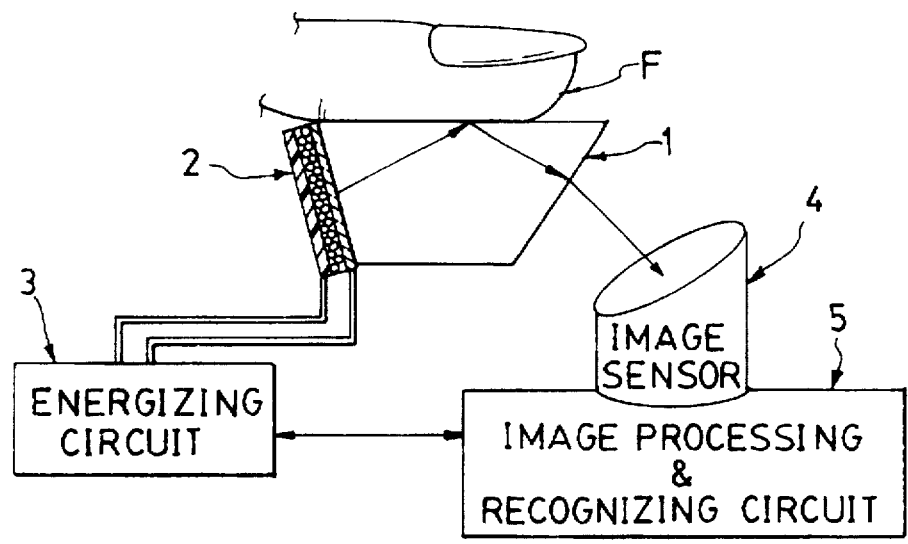
F I G. 3
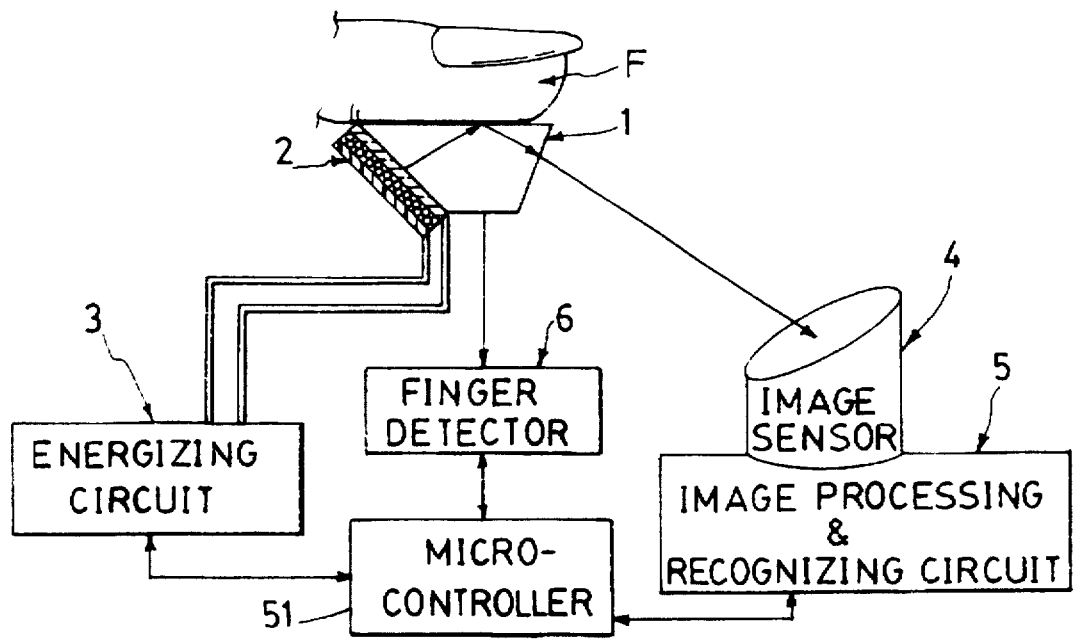
F I G. 4

COMPACT FINGERPRINT RECOGNIZING APPARATUS ILLUMINATED WITH ELECTROLUMINESCENT DEVICE

BACKGROUND OF THE INVENTION

A conventional fingerprint recognition system may use a light source for emitting a light beam projecting to a skin surface of a finger for optically detecting ridges of the fingerprint for processing and recognizing the image of the fingerprint. A conventional light source of incandescent bulbs will require a big volume, thereby being not suitable for portable use. If the light source is a laser beam, a collimating lens should be further provided in between the laser light source and a prism for absorbing at ridges and reflecting at valleys of the fingerprint, still increasing the installation cost and equipment volume.

Even though a LED array may be employed as the light source, the LED array should be arranged in a compact structure to close an optical sensor system to achieve a uniform illumination level. To minimize the volume of the LED array to be a compact structure will increase the production complexity and the production cost thereof.

For meeting the requirements of the modern age with rapid progressive electronic industries and office automation, a tiny, compact and low-cost fingerprint recognition system with uniform illumination is thus desirous.

The present inventors have found the drawbacks of conventional fingerprint recognition systems and invented the present compact fingerprint recognizing apparatus illuminated by electroluminescent device (ELD).

A search of prior arts of fingerprint sensors have been conducted by the present inventors. None of the references shows a fingerprint recognition system illuminated by ELD, including: European patent application No. 91304710.6 (date of publication: Dec. 4, 1991); the U.S. Pat. Nos. 5,146,102; 4,340,300; 4,120,585; 3,882,462; 3,873,970; and 3,864,042.

SUMMARY OF THE INVENTION

The object of the present invention is to provide a fingerprint recognizing apparatus with uniform illumination, compact structure and lower production cost.

According to the present invention, there is provided a fingerprint recognizing apparatus including: a prism, an electroluminescent device (hereinafter designated as an acronym of "ELD") secured or adhered on an incident surface of the prism for emitting a uniform light towards a finger-laying surface of the prism with the light beam reflected at the valleys of the fingerprint, a photosensor selected from a charge-coupled-device (CCD) sensing camera and the other optical sensors for picking up the image as reflected from the prism for converting the image signal or picture information to be a voltage signal, and an image processing and recognizing circuit for processing the voltage signal for fingerprint identification or recognization, wherein the energizing of the ELD is synchronized with the image processing and recognizing for a reliable fingerprint recognization.

BRIEF DESCRIPTION OF THE DRAWINGS

FIG. 3 shows still another preferred style for projecting and reflecting the light from the ELD of the present invention.

FIG. 4 shows a fingerprint recognization system by aids of a finger detector in accordance with the present invention.

DETAILED DESCRIPTION

Figure 1:
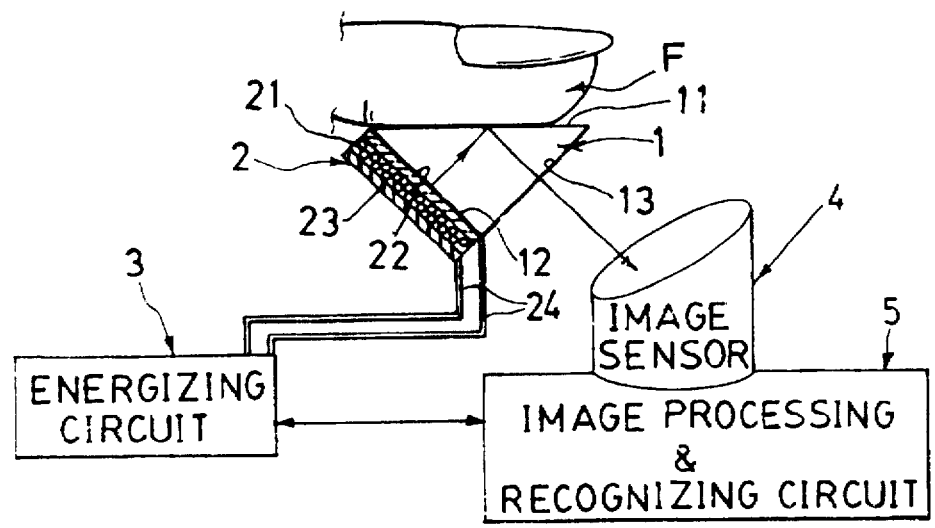
FIG. 1 is an illustration showing a fingerprint recognization system in accordance with the present invention.

As shown in FIG. 1, a preferred embodiment of fingerprint recognizing apparatus of the present invention comprises: a prism 1 of right triangle prism having a hypotenuse side 11 provided on an upper side of the prism for laying a finger F to be detected thereon, a first catheti side 12 positioned at a first side of the hypotenuse side 11, and a second catheti side 13 positioned at a second side of the hypotenuse side 11; an electroluminescent device (ELD) 2 secured to the first catheti side 12 of the prism 1 for emitting light inwardly through the first catheti side 12 of the prism 1 towards the hypotenuse side 11 of the prism 1 to be reflected therefrom or absorbed therein; an energizing circuit 3 for powering and driving the electroluminescent device 2 for its illumination; an image sensor 4 facing the second catheti side 13 of the prism and selected from a charge-coupled-device (CCD) camera, a charge storage type sensor or other image sensors for picking up the image of the fingerprint as reflected from the finger F to be detected and for converting the picture information signal to a voltage or electric signal; and an image processing and recognizing circuit 5 for receiving the voltage signal from the image sensor 4 for processing and recognization of the fingerprint.

The electroluminescent device (ELD) 2 at least includes: an electroluminescent emission layer 21, a transparent conductive layer 22 formed on an upper layer of the electroluminescent emission layer 21, and a substrate conductive layer 23 formed on a bottom layer of the electroluminescent emission layer 21 having an insulative bottom layer (not shown) coated on a bottom of the substrate layer 23, and a pair of wires 24 electrically connecting the two conductive layers 22, 23 to the energizing circuit 3 for powering and driving the ELD 2 for emission of light outwardly for projecting incident light into the prism 1.

The ELD 2 may be adhered onto a light incoming side 12 of the prism 1 by adhesive or may be secured on the prism surface by clamp or other joining methods, not limited in this invention.

The ELD is formed as a strip or a plate to be served as a "surface" light source effectively and sastisfactorily for forming a compact structure for the complete fingerprint recognizing apparatus in accordance with the present invention.

The materials for making the prism 1 of the present invention are not limited. To ensure a total internal reflection or refraction of light emitted by the ELD 2 within the prism 1 is expected by the present invention.

For correcting any optical distortion during the signal transmission of the present invention, a lens may be provided between the prism 1 and the image sensor 4 for obtaining a clear image signal.

The prism 1 as shown in FIG. 1 is a right triangle having a hypotenuse side 11 and two catheti sides 12, 13 as aforementioned. The prism 1 may be formed as an oblique triangular prism or other polygonal prisms.

Other modifications for the prisms 1 may be made in accordance with the present invention.

Figure 2:
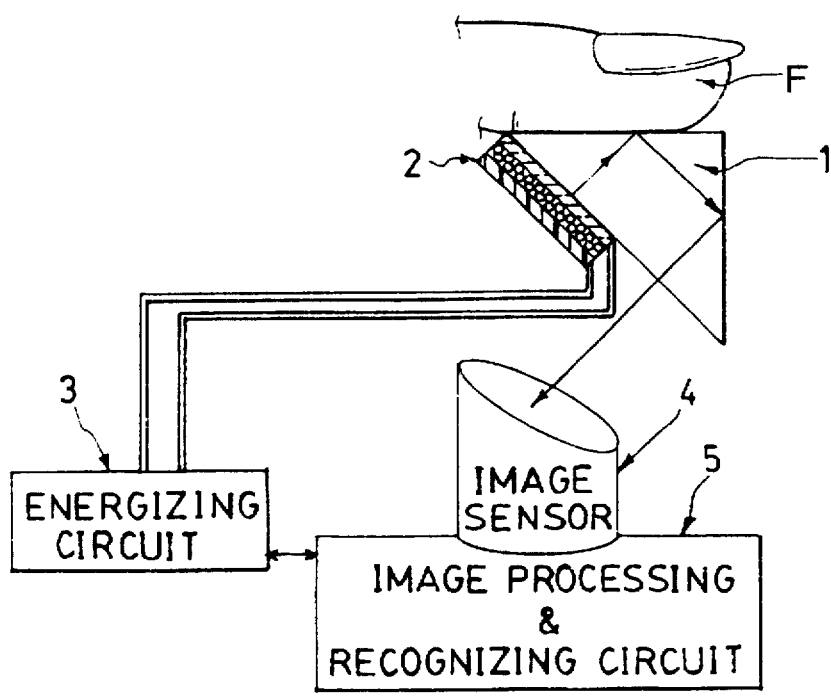
FIG. 2 shows another preferred ELD light projection and reflection mode in accordance with the present invention.

The prism 1 may be arranged to allow the ELD 2 to be adhered on the hypotenuse side of the right-angle triangle as shown in FIG. 2 and by laying the finger F to be detected on one of the catheti sides of the triangle prism for a double reflection of light as emitted from the ELD 2.

As shown in FIG. 3, a trapezoidal prism is disclosed for sensing fingerprint of a finger to be detected.

Accordingly, a prism 1 of the present invention includes a light reflective side such as numeral "11" as shown in FIG. 1 for reflecting an incident light, a light incoming side as numeral 12 for entering the incident light as emitted from ELD 2 into the prism 1, and a light outgoing side as numeral 13 for projecting reflected light outwardly.

A finger detector 6 is disclosed in the present invention as shown in FIG. 4 and a micro-controller 51 of the image processing and recognizing circuit 5 is also provided therein. Such a finger detector 6 is employed to detect the presence of a finger. When a finger F to be detected is laid on the reflective side of the prism 1 to shield an ambient light normally projecting a photoconductive cell (not shown) or any other photosensors, the discontinuity of the ambient light may change a voltage value in the finger detector circuit to trigger the micro-controller 51 of the image processing and recognizing circuit 5 for initiating the fingerprint recognizing operation of the present invention.

Otherwise, when the finger is leaving from the prism 1, the ambient light will not trigger the micro-controller 51 for stopping the operation of the present invention for saving electric energy and for prolonging the service life of the present invention.

However, such a finger detector 6 is not critical and is not absolutely necessary in this invention. A manually operated on-off switch may be provided in this invention.

Figure 5:
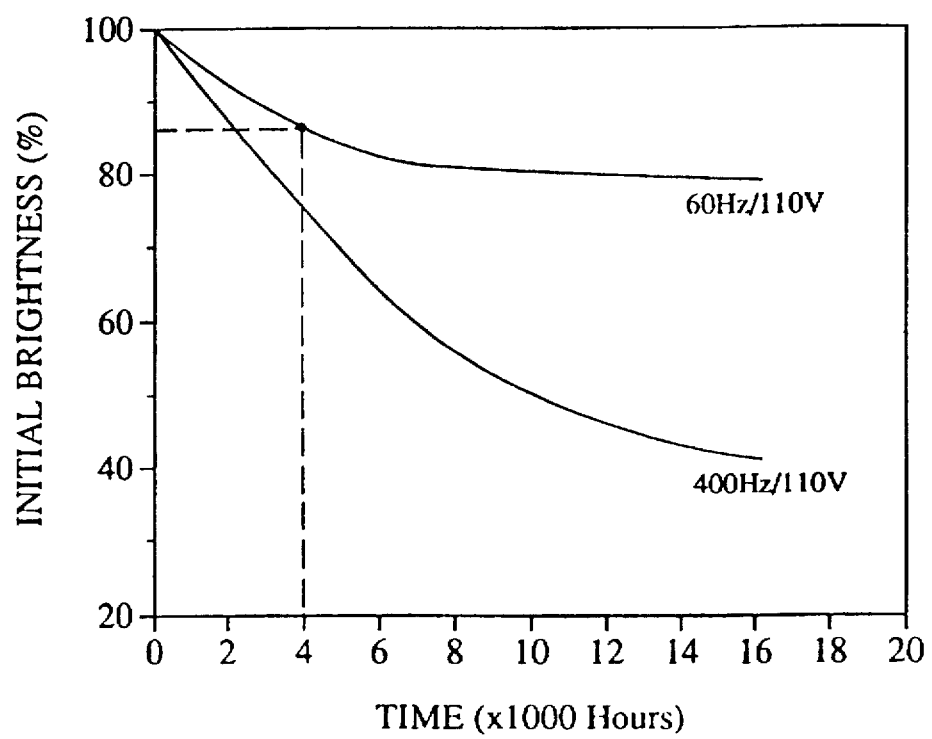
FIG. 5 is a diagram showing the relationship of the ELD brightness with the lapse of time in accordance with the present invention.

As shown in FIG. 5, the ELD 2 of the present invention may deteriorate its luminance or brightness in the lapse of time.

For instance, after 4000 hours of service, the brightness may be deteriorated to be about 85% based on its original brightness of 100% if the driving voltage is 110 volts and the frequency is 60 Hz.

Figure 6:
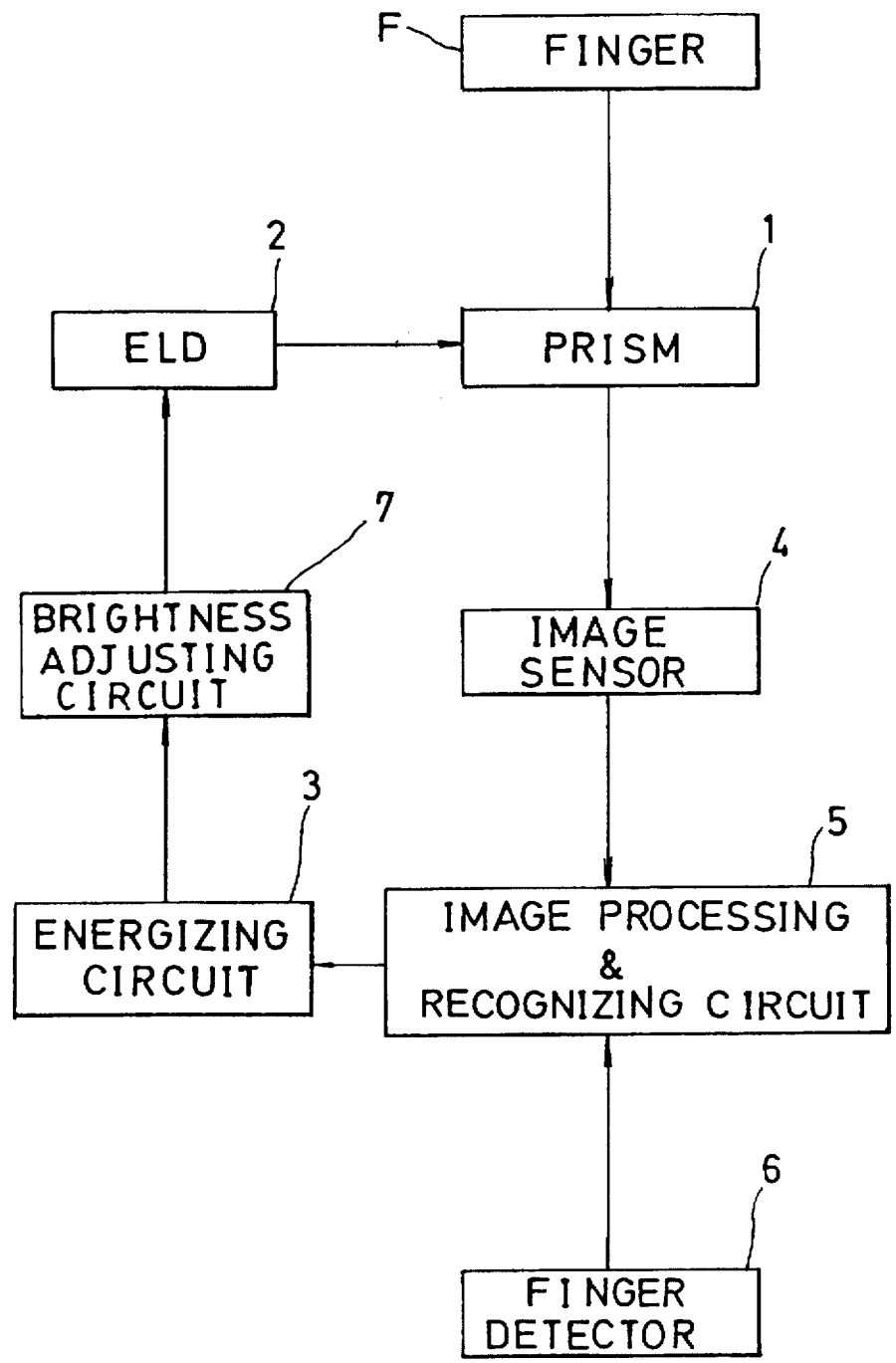
FIG. 6 is a block diagram showing the operation of the present invention.
Figure 7:
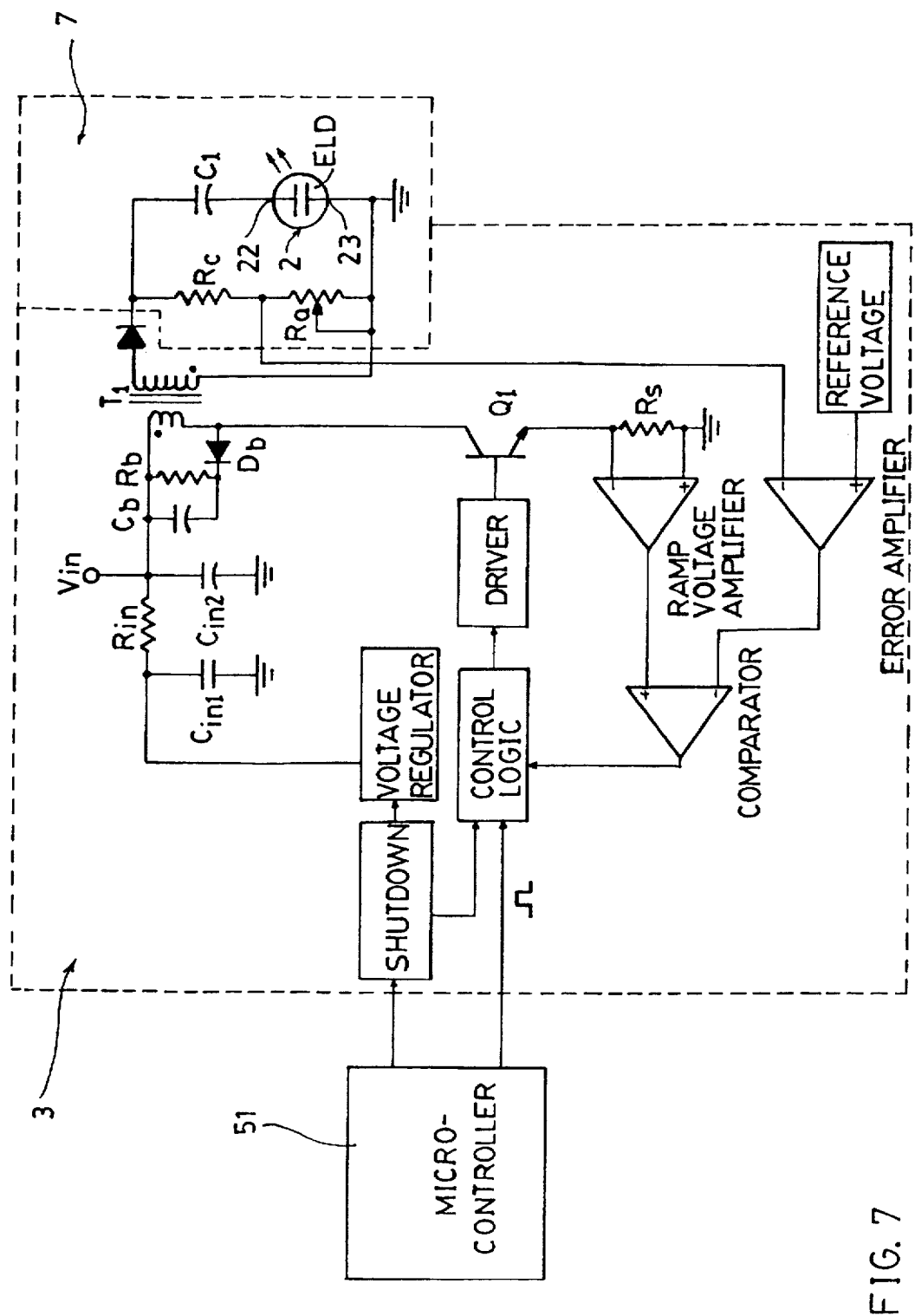
FIG. 7 shows a typical electronic circuit of the ELD brightness adjusting circuit added on the energizing circuit of the present invention.

Therefore, it is very important to provide a brightness adjusting circuit 7 in this invention such as shown in FIGS. 6 and 7 for adjusting the illumination of ELD 2.

The circuit as shown in FIG. 7 is a block diagram of a flyback regulator of the energizing circuit 3 in cooperation with the micro-controller 51 and the brightness adjusting circuit 7 for providing the energizing voltage to the ELD. The energizing circuit 3 majorly includes a transistor Q1 having its base electrically connected to the micro-controller 51 of the image processing and recognizing circuit 5 of the present invention for receiving an input signal from the micro-controller 51, a collector of the transistor Q1 electrically connected to a primary winding of the transformer T1 operatively self-exciting the input voltage Vin to an increased value to drive the ELD 2, and an emitter of the transistor Q1 grounded; and the transformer T1 having a secondary winding coupled to the primary winding of T1 and having two opposite ends of the secondary winding of the transformer T1 electrically connected to two conductive layers 22, 23 of ELD 2 for outputing the energizing voltage to the ELD 2. When the switching transistor Q1 is turned on, current flows through the primary winding of T1, storing energy in the transformer. When Q1 is turned off, energy is released on the secondary winding of T1 thus delivering the driving voltage to the ELD. C1 blocks all the DC components. The driving voltage is controlled by modulating the current through Q1. This is achieved with a feedback voltage from the potential divider formed by Ra and Rc. Ra (a variable resistor with variable resistance) and Rc (a fixed-resistance resistor) are connected in series across two ends of the secondary winding of T1, and are parallelly connected to two conductive layers 22, 23 of ELD. The resistance of Rc is kept at a constant value, while Ra is a variable resistor which can be varied for adjusting the output voltage for driving the ELD. The error amplifier amplifies the difference between this feedback voltage as picked up from a junction between Ra and Rc and a pre-determined reference voltage. The output of the error amplifier is compared to a ramp voltage amplifier in which a ramp voltage is obtained with Rs and is proportional to the current passing through Q1 (or the primary winding of T1). The comparator terminates the switch at Q1 when these voltages are equal. As a result, we can control the output voltage by adjusting the value of Ra. The switching frequency of Q1 is dependent on the SQUAREWAVE input from the microcontroller. The voltage and the SQUAREWAVE frequency of the output current from the energizing circuit 3 will determine the intensity of the ELD, namely, the brightness of ELD.

The ELD can be turned off by sending an OFF signal to the Shutdown circuit which turns off the voltage regulator and disables the switching action at Q1 during the OFF period. The voltage regulator is used here to provide regulated power to the other circuit modules. Turning off the voltage regulator will minimize power dissipation at each module. Since the primary winding of T1 draws abruptly changing amount of current from Vin, Rin, Cin1 and Cin2 are required to filter the power source and to store energy for the voltage regulator. Cb, Rb and Db form a snubber circuit to clamp spike from the primary winding of T1 which may occur immediately after Q1 is switched off.

The energizing voltage pulses for driving the ELD 2 may be synchronized with the image recognizing procedure in the present invention to prevent flickering effect and to enhance a reliable fingerprint recognization.

When operating the present invention as shown in FIG. 6 and the other drawing figures, the finger F to be detected is laid on the prism 1 and the ELD 2 is driven for illumination for emitting light towards the finger surface laid on the prism with the light being absorbed at the ridges and the light being reflected at the valleys of the fingerprint. The CCD image sensor 4 will pick up the image signal as reflected from the prism 1 to convert the image signal to be electric or voltage signal which may then be digitized, processed and recognized in the image processing and recognizing circuit 5 including a micro-controller 51 therein. The energizing circuit 3 is synchronized with the processing and recognizing procedure as executed in the image processing and recognizing circuit 5. The processing and recognizing circuit 5 may be pre-stored with reference fingerprints for comparison with the fingerprint to be detected which is now sensed by the sensor 4 and recognized by the processing and recognizing circuit 5, thereby performing an identification or recognization for the fingerprint of the finger F to be detected.

The micro-controller 51 of the image processing and recognizing circuit 5 plays several roles such as to initiate the digitizing sequence, to initiate a reading cycle to obtain the digitized image from a random acess memory (RAM) module in the processing and recognizing circuit 5, or to turn off an analog digital converter (ADC) in the circuit 5, and also to turn off the energizing circuit 3 of the ELD 2.

The image processing and recognizing circuit 5 may be modified by those skilled in the art and is not claimed in this invention.

The present invention by using ELD as an illuminator for fingerprint identification is superior to any conventional fingerprint recognization systems with the following advantages:

1. The ELD 2 is made-as a thin sheet or strip easily adhered or securable to a side surface of the prism 1, adapted for making a compact fingerprint recognizing apparatus with minimized volume, convenient for portable use.

2. The surface light source can be made as close as possible to approximate the object (finger) to be detected to reduce any distortion when transmitting the optical or image signals for increasing a reliability and precision of the fingerprint identification.

3. The ELD can be easily mounted on the prism to thereby decrease the production cost.

4. The ELD may consume less electric energy in comparison with other light sources for saving operation cost of the fingerprint recognization systems.

5. Uniform illumination may be obtained, thereby being helpful for a clear sensing of fingerprint image.

6. Even though the brightness of the ELD is deteriorated after long time service, it can be compensated by adjusting the frequency and voltage of the energizing circuit for driving the ELD for obtaining a satisfactory brightness of the ELD for continuously performing a fingerprint recognization at a higher quality level. Also, keeping a brightness of the ELD can be well maintained directly in the recognizing apparatus for simplifying the maintenance of the apparatus.

The present invention may be modified without departing from the spirit and scope of this invention.

We claim:

1. A fingerprint recognizing apparatus comprising:

a polygonal prism (1) having a light-reflective side for laying a finger to be detected thereon, a light-incoming side disposed at a first side of said light-reflective side for entering an incident light through said light-incoming side, and a light-outgoing side disposed at a second side of said light-reflective side for projecting light as reflected from said light-reflective side outwardly through said light-outgoing side;

an electroluminescent device (ELD,2) formed as a strip and secured on said light-incoming side of said prism (1) for emitting light entering into said prism (1) through said light-incoming side of said prism (1) and projecting the light towards a finger surface of said finger laid on said light-reflective side of said prism (1) for reflecting a fingerprint image from said finger;

an energizing circuit (3) electrically connected to said ELD (2) and operatively powering and driving said electroluminescent device (2) for illumination thereof for emitting light projecting into said prism (1) and said finger to be detected;

an image sensor (4) facing said light-outgoing side of said prism (1) for picking up an image signal of said fingerprint image as reflected from said light-reflective side of said prism (1) and converting the image signal to a voltage signal; and an image processing and recognizing circuit (5) electrically connected to said image sensor (4) for receiving said voltage signal from said image sensor (4) and operatively processing and recognizing said voltage signal for an identification of the fingerprint as sensed from the finger to be detected;

said ELD (2) including at least an electroluminescent emission layer (21) sandwiched in between a transparent conductive layer (22) and a substrate conductive layer (23) having an insulative bottom layer coated on a bottom of said substrate conductive layer, said transparent conductive layer (22) adhered on said light-incoming side of said prism (1), and said two conductive layers (22,23) electrically connected to said energizing circuit (3) for driving said electroluminescent device (2) for illumination thereof;

said energizing circuit (3) connected with a brightness adjusting circuit (7), said brightness adjusting circuit (7) operatively adjusting a voltage and frequency value of said energizing circuit (3) for adjusting a brightness of said ELD (2) as deteriorated with the lapse of time, said ELD (2) having two conductive layers electrically connected with the brightness adjusting circuit (7);

said energizing circuit (3) including a transistor (Q1) having a base electrically connected to a micro-controller (51) of an image processing and recognizing circuit (5) for receiving an input signal from the micro-controller (51), a collector of the transistor (Q1) electrically connected to a primary winding of a transformer (T1) operatively self-exciting an input voltage (Vin) to increase an output energizing voltage to drive the ELD (2), and an emitter of the transistor (Q1) grounded; and the transformer (T1) having a secondary winding coupled to the primary winding of the transformer (T1) and having two opposite ends of the secondary winding of the transformer (T1) electrically connected to two conductive layers (22, 23) of the ELD (2) for outputing the energizing voltage to the ELD (2); and said micro-controller operatively adjusting a frequency of a sguarewave input to said transistor (Q1) for adjusting a frequency of an output current from said transformer (T1) for adjusting a brightness of said ELD (2); and said brightness adjusting circuit (7) including a variable resistor having variable resistance (Ra) and a fixed-resistance resistor (Rc) connected in series across two ends of the secondary winding of the transformer (T1) of the energizing circuit (3), said two resistors (Ra, Rc) parallelly connected to two said conductive layers (22, 23) disposed on two sides of said electroluminescent emission layer (21) of said ELD (2), whereby upon varying of said variable resistor (Ra) to change an output voltage of said energizing circuit (3), a brightness of said ELD (2) as driven by said energizing circuit (3) is adjusted.

\* \* \* \* \*